(12) United States Patent (10) Patent No.: US 7,754,607 B2
Chou (45) Date of Patent: Jul. 13, 2010

(54) METHOD FOR MANUFACTURING A LIQUID CRYSTAL DISPLAY

(75) Inventor: Weng-Bing Chou, Gueishan Township, Taoyuan County (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/432,254

(22) Filed: Apr. 29, 2009

(65) Prior Publication Data

US 2009/0209054 A1 Aug. 20, 2009

Related U.S. Application Data

(62) Division of application No. 11/235,573, filed on Sep. 26, 2005, now Pat. No. 7,545,452.

(30) Foreign Application Priority Data

Oct. 7, 2004 (TW) .............................. 93130334 A (51) Int. Cl.
*H01L 21/00* (2006.01)
(52) U.S. Cl. ........................... 438/666; 438/30; 349/51; 257/E27.131
(58) Field of Classification Search .................. 438/30, 438/149, 666; 257/E27.132; 349/49, 50, 349/51, 52
See application file for complete search history.

(56) References Cited

U.S. PATENT DOCUMENTS

| | | | |
|---|---|---|---|
| 5,042,917 A | 8/1991 | Fujita et al. | 349/50 |
| 5,926,236 A | 7/1999 | den Boer et al. | 349/51 |
| 6,008,872 A | 12/1999 | den Boer et al. | 349/106 |
| 6,225,968 B1 | 5/2001 | den Boer et al. | 345/91 |
| 6,243,062 B1 | 6/2001 | den Boer et al. | 345/91 |
| 6,548,831 B1 | 4/2003 | Tokuhiro et al. | 257/72 |
| 7,432,528 B2 | 10/2008 | Chou | 257/59 |
| 7,460,192 B2 | 12/2008 | Oh et al. | 349/50 |
| 2005/0105010 A1 | 5/2005 | Oh et al. | 349/50 |
| 2005/0117083 A1 | 6/2005 | Oh et al. | 349/51 |
| 2007/0040956 A1 | 2/2007 | Shin et al. | 349/50 |

*Primary Examiner*—Jarrett J Stark
(74) *Attorney, Agent, or Firm*—Kusner & Jaffe (57) ABSTRACT

A method for manufacturing a liquid crystal display, the method includes steps of depositing a transparent conductive layer, forming a pixel electrode, and four bottom layers, depositing a semiconductor insulation layer on the pixel electrode and the four bottom layers, defining the semiconductor insulation layer to form two contact openings two of the bottom layers, depositing and defining two top layers and two scanning lines both with an indentation at an edge thereof, and the indentations face the first pixel electrode by an opposite direction, and forming four metal-insulation-metal (MIM) diodes.

20 Claims, 9 Drawing Sheets

METHOD FOR MANUFACTURING A LIQUID CRYSTAL DISPLAY

RELATED APPLICATIONS

This application is a divisional application of application Ser. No. 11/235,573, filed Sep. 26, 2005 now U.S. Pat. No. 7,545,452, which claims priority to Taiwan Application Serial Number 93130334, filed Oct. 7, 2004, the disclosure of both the application Ser. No. 11/235,573 and Taiwan Application Serial Number 93130334 are hereby incorporated by reference herein in its entirety.

BACKGROUND OF THE INVENTION

1. Field of the Invention

The present invention relates to a method for manufacturing a liquid crystal display, and more particularly to a method for manufacturing a high aperture TFD LCD device.

2. Description of the Prior Art

Nowadays liquid crystal display (LCD) devices are widely applied in daily life, such as display devices of PAD, PC, Notebook, TV, electronic watches, digital clocks, operating interface of copy machines, or odometer and speedometer in car interior with LCD thereon. LCD devices have monochrome display and passive driving circuits from earlier period to now with more than 64K levels and active driving circuits to promote applications of LCD devices.

Present LCD devices are using active driving circuits to drive liquid crystal. Thin film transistors (TFT) are commonly used to control alignment of liquid crystal in active LCD devices. Nevertheless, fabrication of TFT is complicated due to 4 to 5 photolithographic processes are required. Further, very complicated half-tone lithographic process or other trick lithographic process is introduced to reduce numeral lithographic processes, but LCD panel manufacture yield is lowered down.

One method for manufacturing active driving circuits is using thin film diode (TFD) as driving entity. Several advantages, such as simple structure as well as process, and higher yield, are shown within TFD, as shown in U.S. Pat. Nos. 5,926,236 and 6,008,872.

Figure 1:
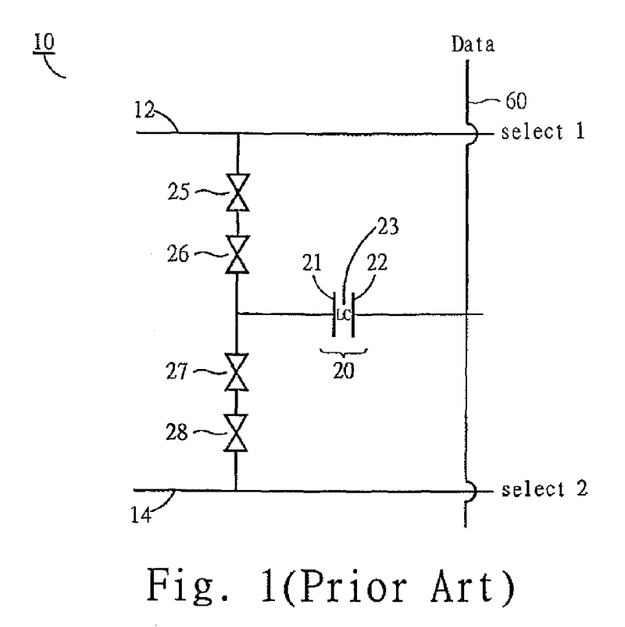
FIG. 1 illustrates a schematic representation of a pixel cell electric circuits of a conventional back-to-back TFD LCD.
Figure 2:
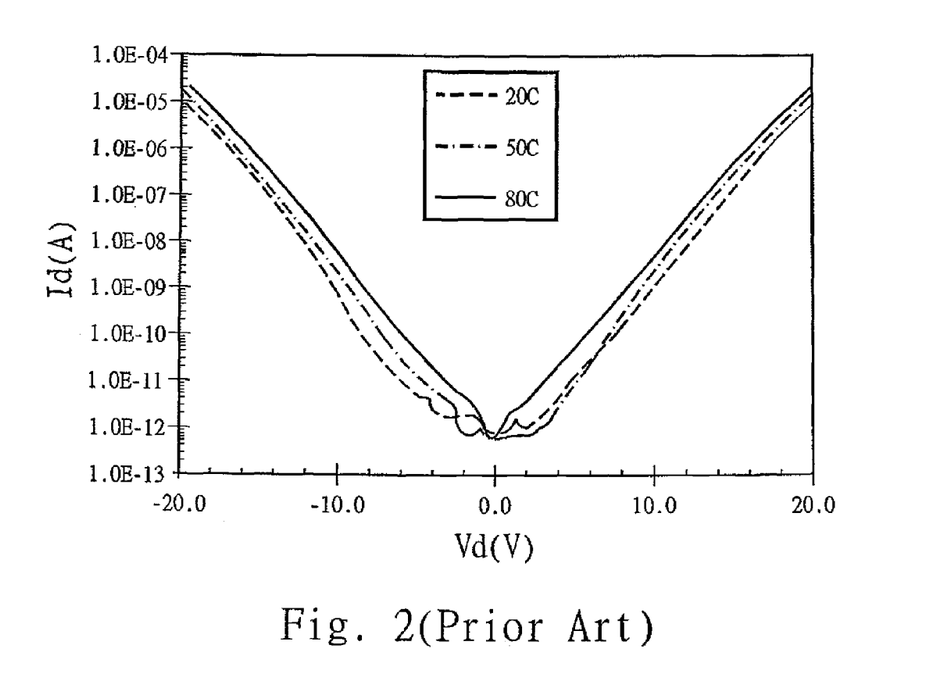
FIG. 2 illustrates a schematic representation of current-voltage diagram of a conventional back-to-back TFD LCD.

However, the current-voltage diagram is asymmetric in the above TFD, which encounters some issues in driving circuits. Moreover, remnant shade and inhomogeneous gray scale also happens here. Four TFDs are used to improve above issues, as shown in FIG. 1. A pixel cell 10 comprises a liquid crystal capacitor 20, 4 metal-insulation-metal (MIM) diodes 25, 26, 27, and 28, two selecting lines (also known as scanning lines) 12, 14, and a data line 60, wherein the liquid crystal capacitor 20 comprises a pair of pixel electrodes 21, 22, and liquid crystal molecule 23 between the pair of pixel electrodes 21, 22. This kind of structure is know as dual-select back-to-back TFD device, in which current-voltage diagram will be symmetric, as shown in FIG. 2. Related technique can be referred to U.S. Pat. No. 6,225,968, U.S. Pat. No. 6,243,062, JP publication 2002-043657, 2000-098429, 11-305267, TW publication 571169, 500947, and EPO 434627.

Figure 3:
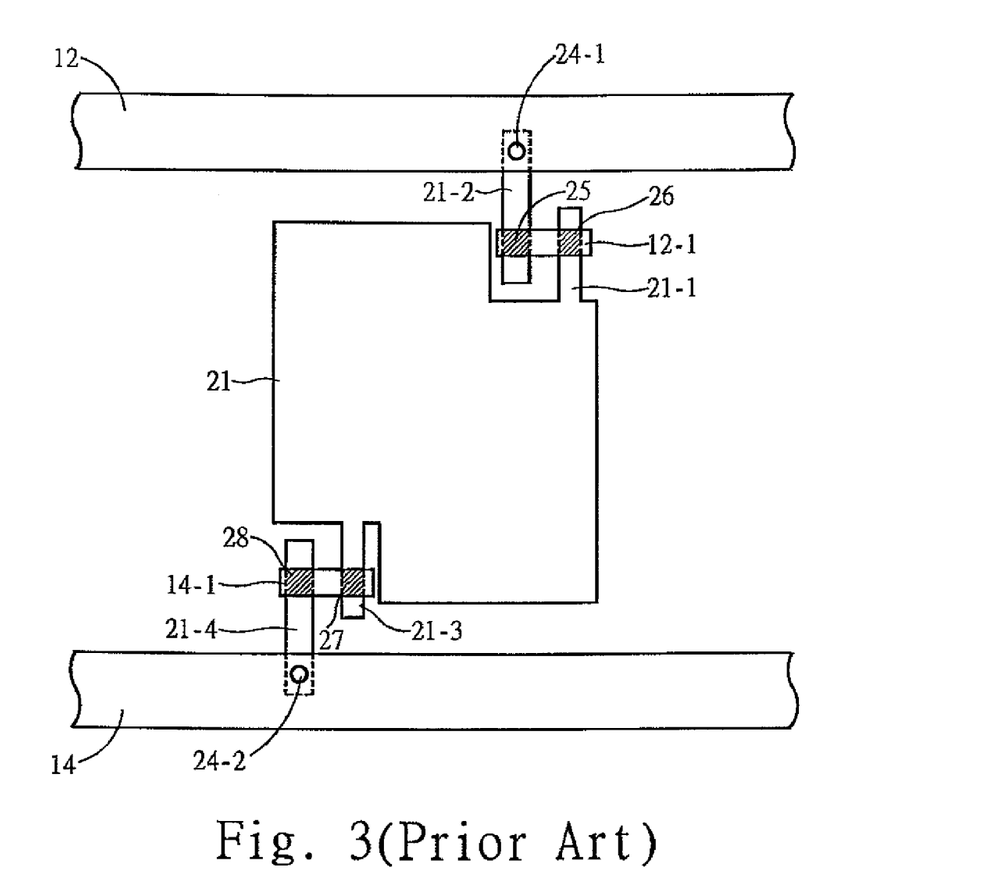
FIG. 3 illustrates a schematic representation of active devices, scanning lines, and pixel electrode on a first substrate of a conventional back-to-back TFD LCD.

However, there is still issue here to be improved in dual-select back-to-back TFD device. As shown in FIG. 3, a portion of liquid crystal cell 10 in FIG. 2 is shown in schematic representations. A pixel electrode 21, four MIM diodes 25, 26, 27, and 28, and two selecting lines 12, 14, which all are on an active substrate, are shown in FIG. 3. Another pixel electrode 22, and data line 60 in FIG. 1 are on color filter substrate. When the active substrate and the color filter substrate are sealed, liquid crystal molecule will be injected into a space between the two substrates to form an LCD panel. Four TFDs 25, 26, 27, and 28 occupy a portion of pixel electrode 21, so that the pixel aperture is reduced.

Hence, a novel structure is necessary to increase pixel aperture for the MIM diode structure and also maintains simple process as well as high manufacture yield.

SUMMARY OF THE INVENTION

For the invention background mentioned above, the conventional TFD device that create many problems and drawbacks. The main purpose of this invention is to provide a high aperture TFD LCD device. The four back-to-back diodes are designed on selecting lines to increase aperture. Manufacture method is to form a transparent conductive layer on a glass substrate as a pixel electrode and a first metal layer of the TFD first. A semiconductor insulation layer is then formed thereon. A metal layer is formed on the semiconductor insulation layer as selecting lines, and back-to-back diodes formed within the selecting lines.

It is another object of this invention that simple process and high yield can be kept.

According to the objects above, this invention provides a thin film diode LCD device with high aperture ratio, which comprises a first substrate, a second substrate and liquid crystal molecule between the first substrate and the second substrate. The first substrate comprises a transparent conductive layer thereon, a semiconductor insulation layer on the transparent conductive layer and the first substrate, and a metal layer on the semiconductor insulation layer. The transparent conductive layer comprises a first pixel electrode, a first bottom layer, a second bottom layer electrically connected to the first pixel electrode, a third bottom layer, and a fourth bottom layer electrically connected to the first pixel electrode. The semiconductor insulation layer, covering the first substrate and the transparent conductive layer, has a first contact opening on the first bottom layer and a second contact opening on the third bottom layer. The metal layer has a first scanning line, a second scanning line, a first top layer, and a second top layer, wherein the first scanning line electrically connects to the first bottom layer via said first contact opening and has a first indentation, and the second scanning line electrically connects to the third bottom layer via the second contact opening and has a second indentation. The first top layer electrically isolating to the first scanning line is within the first indentation, and the second top layer electrically isolating to the second scanning line is within the second indentation. Overlapped region of the first bottom layer and the first top layer is a first MIM diode, overlapped region of the second bottom layer and the first top layer is a second MIM diode, overlapped region of the third bottom layer and the second top layer is a third MIM diode, and overlapped region of the fourth bottom layer and the second top layer is a fourth MIM diode.

The second substrate comprises a second pixel electrode thereon, and a data line electrically connecting to the second pixel electrode and about perpendicular to the first and second scanning line. The second pixel electrode overlaps to the first pixel electrode when the first substrate and the second substrate are sealed.

In this invention, an active device for controlling a LCD device comprises a first scanning line, a second scanning line, a first MIM diode, a second MIM diode, a third MIM diode, a fourth MIM diode, and a pixel electrode. The pixel electrode is electrically connected to one end of the second MIM diode and one end of the fourth MIM diode. The first scanning line is electrically connected to one end of the first MIM diode and has a first indentation; the second scanning line is electrically connected to one end of the third MIM diode and has a second indentation. The other end of the first MIM diode is electrically connected to the other end of the second MIM diode; the other end of third MIM diode is electrically connected to the other end of the fourth MIM diode. The first MIM diode and the second MIM diode are within the first indentation of the first scanning line; the third MIM diode and the fourth MIM diode are within the second indentation of the second scanning line.

This invention provides a method for manufacturing an active device for controlling a liquid crystal display device, which comprises a step of depositing a transparent conductive layer on a first substrate. Then, the transparent conductive layer is defined as a pixel electrode region, a first bottom layer, a second bottom layer electrically connected to said pixel electrode region, a third bottom layer, and a fourth bottom layer electrically connected to said pixel electrode region. Next, a semiconductor insulation layer is deposited on said first substrate and said transparent conductive layer. A first contact opening is formed on said first bottom layer, and a second contact opening is formed on said third bottom layer. A metal layer is then deposited on said semiconductor insulation layer. The metal layer is defined as a first scanning line, a second scanning line, a first top layer, and a second top layer, wherein said first scanning line electrically connects to said first bottom layer via said first contact opening and has a first indentation, and said second scanning line electrically connects to said third bottom layer via said second contact opening and has a second indentation, wherein said first top layer is within the first indentation of the first scanning line and isolated therewith, and said second top layer is within the second indentation of the second scanning line and isolated therewith, wherein overlapped region between said first bottom layer and said first top layer is a first MIM diode, overlapped region between said second bottom layer and said first top layer is a second MIM diode, overlapped region between said third bottom layer and said second top layer is a third MIM diode, and overlapped region between said fourth bottom layer and said second top layer is a fourth MIM diode.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Moreover, the dimensions of drawings only for reference due to they have been exaggerated and simplified.

TFDs are formed within scanning lines in this invention to increase LCD aperture without occupying area of pixel electrode.

Figure 4:
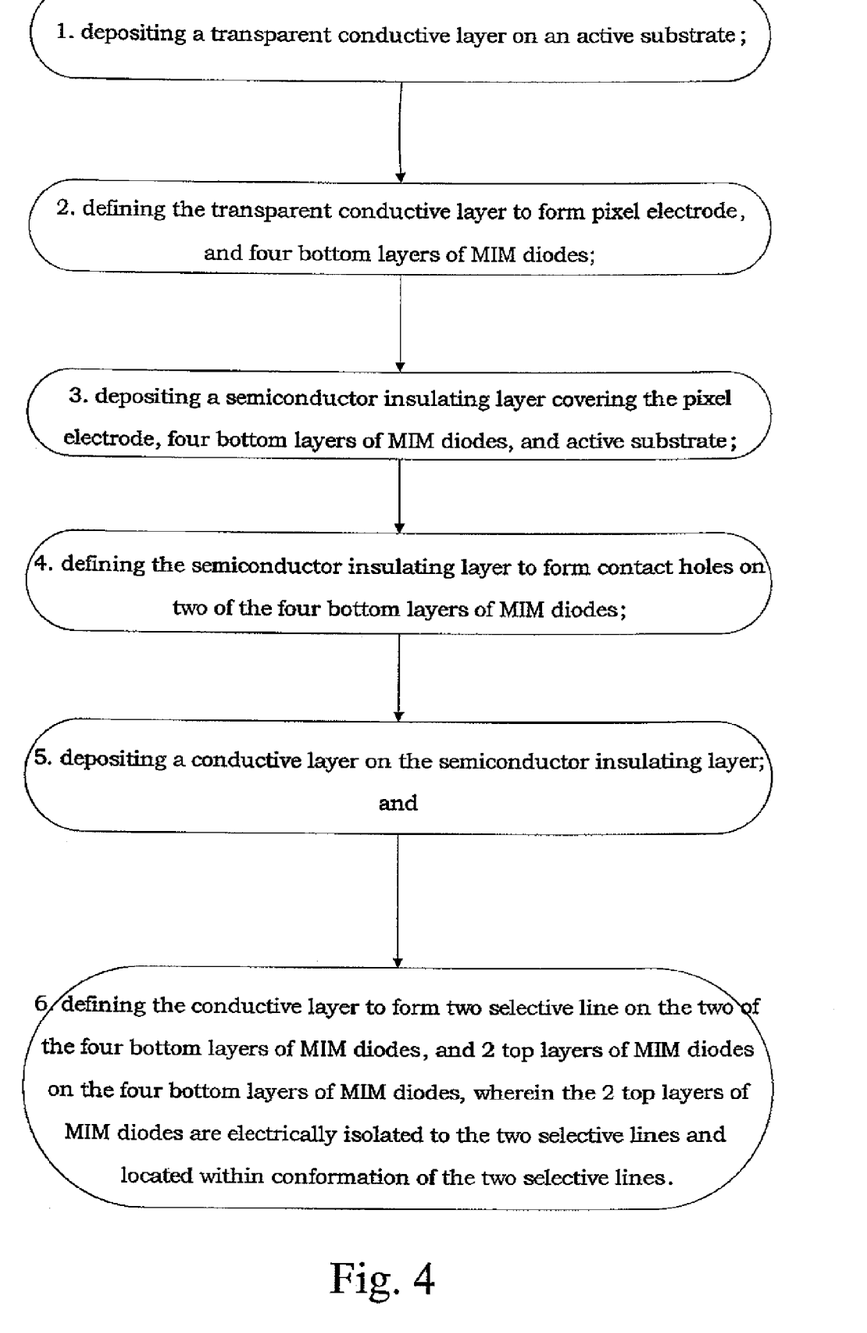
FIG. 4 shows flow chart of this invention in each stage.

A novel dual select back-to-back TFD structure for LCD device and method thereof are provided. The manufacture process, as shown in FIG. 4, comprises a step of depositing a transparent conductive layer on a first substrate, in which the transparent conductive layer can be ITO (indium tin oxide) or IZO (indium zinc oxide). The transparent conductive layer is then defined to form a pixel electrode, and four bottom layers of four MIM diodes. The define process includes photolithographic and etching steps to transfer patterns to the transparent conductive layer to form the pixel electrode and the four bottom layers. Two bottom layers of the four bottom layers of the four MIM diodes electrically connect to the pixel electrode respectively. Another two bottom layers of the four bottom layers of the four MIM diodes physically isolate to the pixel electrode respectively. A semiconductor insulation layer is then deposited to cover the pixel electrode, four bottom layers of the four MIM diodes, and the first substrate, in which the semiconductor insulation layer can be silicon nitride, or other material that provides electric isolation and as insulation layer in the MIM diodes. The semiconductor insulation layer is defined to form two contact openings on two of the four bottom layers of the four MIM diodes, in which neither the two bottom layers electrically connect to the pixel electrode. Next, a conductive layer, which is metal, is deposited on the semiconductor insulation layer. The conductive layer is then defined to form two selecting lines on two bottom layers of the four MIM diodes, and two top layers of the four MIM diodes, wherein the two top layers of the four MIM diodes are electrically isolated to the two selecting lines and disposed on the first substrate and within the indentations of the two selecting lines. Similarly, this step also includes lithographic process and etching step to form necessary patterns.

The following illustrates one embodiment of this invention shown in FIG. 4, that FIG. 5 shows top view of schematic representation of each step and FIG. 6 shows cross-sectional view of schematic representation of each step in accordance with dash line AB in FIG. 5.

Figure 5A:
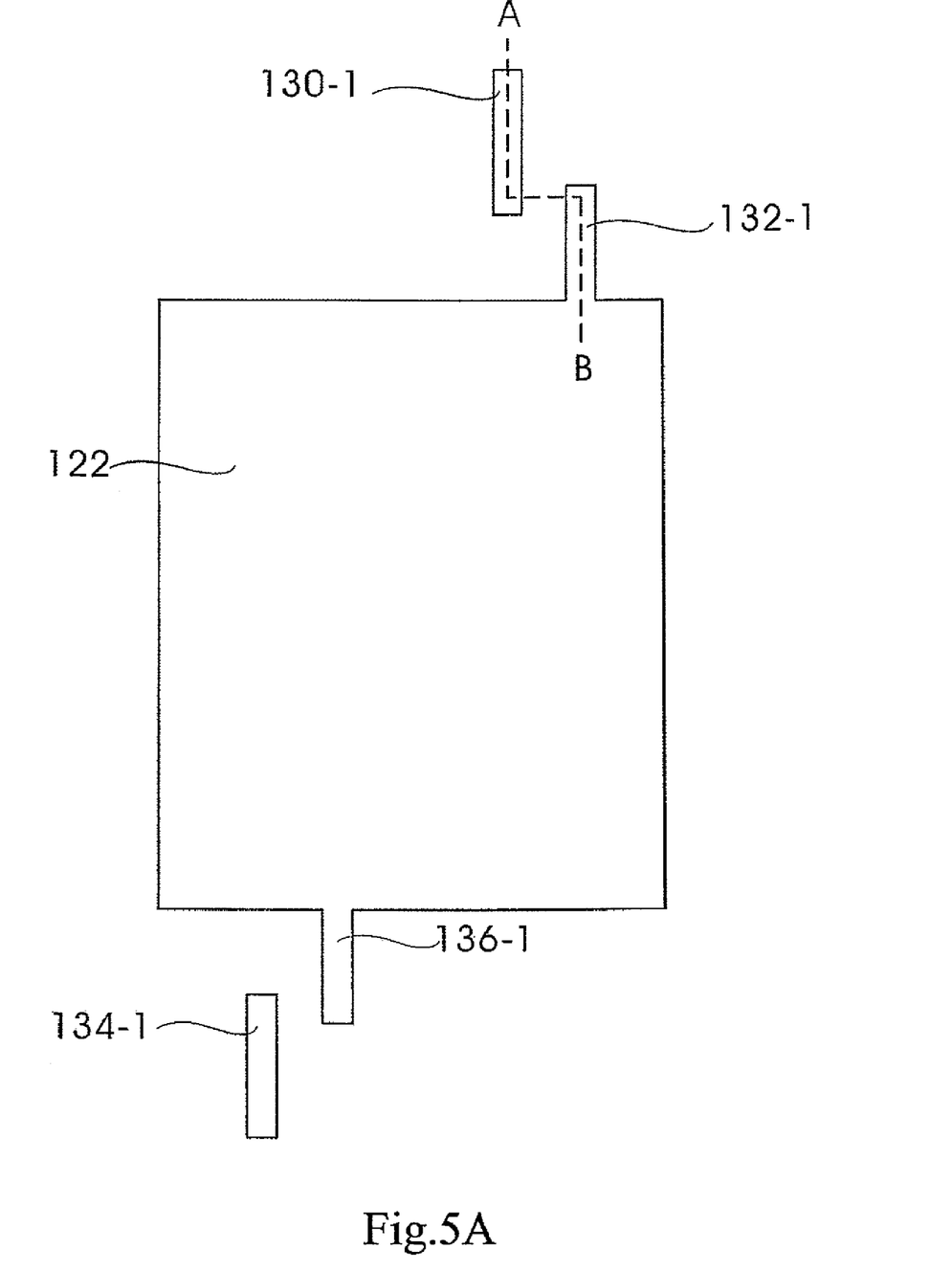
FIGS. 5A to 5C illustrate a schematic representation of top views of each process stage in accordance with this invention.
Figure 6A:
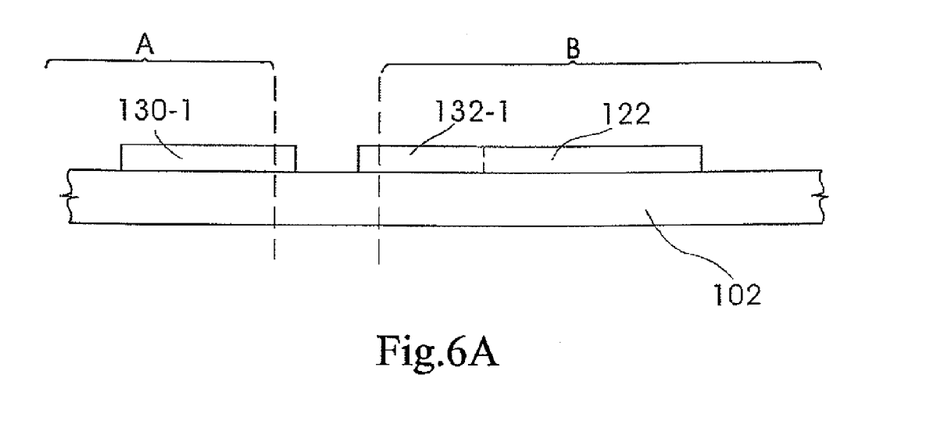
FIGS. 6A to 6E illustrate a schematic representation of sectional views of each process stage in accordance with this invention

FIG. 5A shows a pixel electrode 122, a first bottom layer 130-1, a second bottom layer 132-1, a third bottom layer 134-1, and a fourth bottom layer 136-1 of four MIM diodes. FIG. 6A shows cross-sectional view in accordance with dotted line AB in FIG. 5A. A transparent conductive layer is deposited on an active substrate 102, and defined to a pixel electrode 122, a first bottom layer 130-1, a second bottom layer 132-1, a third bottom layer 134-1 and a fourth bottom layer 136-1 of four MIM diodes by using photolithographic process and etching step, in which the second bottom layer 132-1 and the fourth bottom layer 136-1 are electrically connected to the pixel electrode 122, and the first bottom layer 130-1 and the third bottom layer 134-1 are physically isolated to the pixel electrode 122. General photolithographic process comprises photoresist coating, soft bake, exposure with mask, develop, hard bake, and photoresist strip. Developed photoresist has the same pattern to the mask, and an etching step is performed to transfer patterns of pixel electrode and the four bottom layers to the transparent conductive layer. The etching step can be wet etching or dry etching, in which the transparent conductive layer has the same patterns to the photoresist layer. Then, the photoresist layer is removed.

In FIG. 6A, portion A shows schematic representation of sectional view along with the first bottom layer 130-1, and portion B show sectional view along with the second bottom layer 132-1 and portion of pixel electrode 122. The first bottom layer 130-1 and the second bottom layer 132-1 are electrically isolated between the two dotted lines.

When using backlight, the active substrate 102 can be glass, or transparent polymer. The so-called active substrate is due to active devices, which are diodes in this invention, are formed on the substrate. Another substrate is called color filter substrate generally due to color filter, in FIG. 5D, a schematic representation of a pixel cell electric circuits of a present back-to-back TFD LCD, the other pixel electrode 222 and data lines 60' are formed on the other substrate and are electrically connected to the other substrate. The color filter substrate is also called passive substrate, because all devices thereon are passive device. The transparent conductive layer can be, for example, ITO or IZO, formed by using vacuum evaporation or sputtering. For example in sputtering, indium oxide and tin oxide are formed previously, and then both powder of indium oxide and tin oxide are sintered to indium tin oxide target. Glow discharge is generated by argon in a vacuum chamber to make Ar+ ions impact to cathode indium tin oxide target, such that indium tin oxide will be sputtered to anodic glass substrate to form ITO film.

Figure 6B:
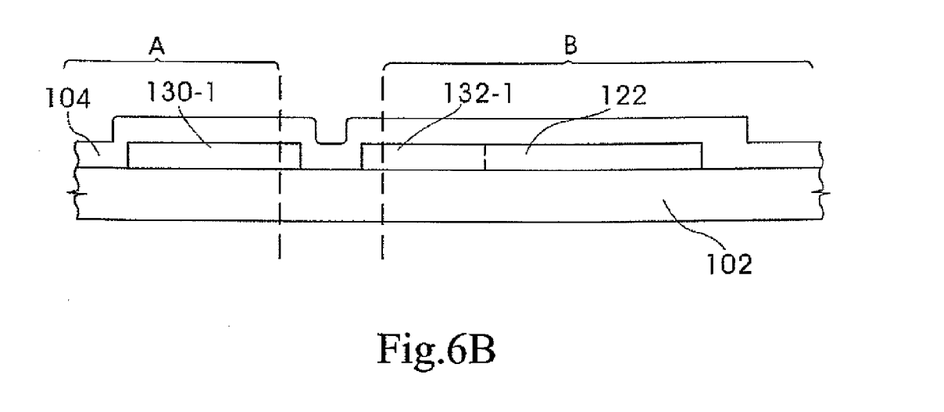

Then, as shown in FIG. 6B, a semiconductor insulation layer 104 is deposited to cover the active substrate 102, the pixel electrode 122, the first bottom layer 130-1, the second bottom layer 132-1, the third bottom layer 134-1 (not shown in FIG. 6B) and the fourth bottom layer 136-1 (not shown in FIG. 6B) of the four MIM diodes. This step will be easier to be interpreted by using sectional view than top view, so only sectional view is illustrated. Semiconductor insulation layer 104 provides a middle insulation layer of the four MIM diodes. The semiconductor insulation layer 104 can be silicon oxide, silicon nitride, silicon oxynitride, tantalum oxide, silicon carbide alloy, or other material, or a combination of the above materials. Silicon nitride is commonly used for better current-voltage characteristic. Plasma enhanced chemical vapor deposition (PECVD) method is usually utilized to form silicon nitride.

Figure 5B:
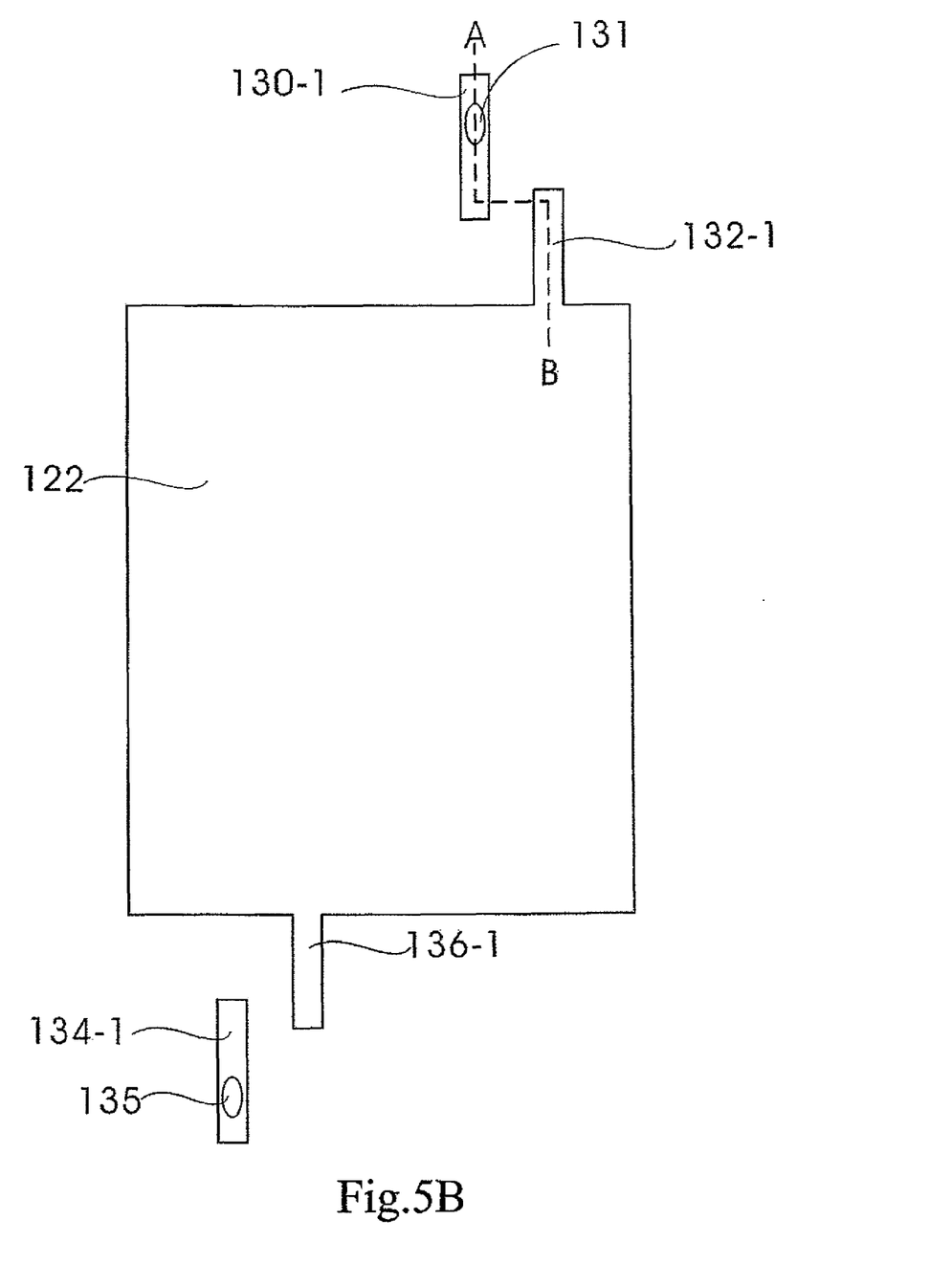
Figure 6C:
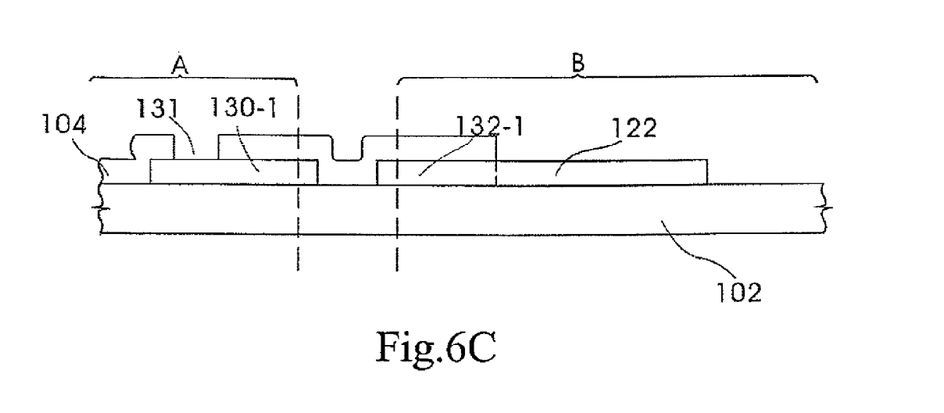

Then, the semiconductor insulation layer 104 is defined to form a first contact opening 131 on the first bottom layer 130-1, and a second contact opening 135 on the third bottom layer 134-1, as shown in FIG. 5B and FIG. 6C. Portion of the semiconductor insulation layer 104 on the pixel electrode 122 is also removed. In this stage, similar photolithographic process and etching step are used, and only mask patterns are changed to contact the opening patterns and the pixel electrode pattern. Further, appropriate etchant are used to remove a portion of semiconductor insulation layer 104.

Figure 6D:
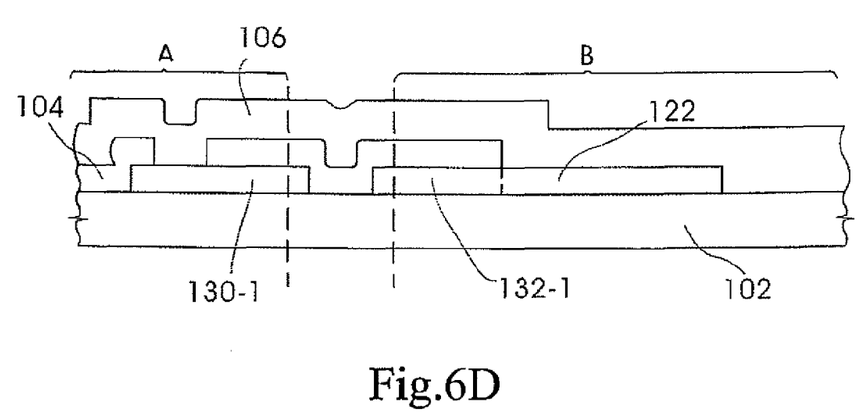

Next, a conductive layer 106 is formed on the semiconductor insulation layer 104, as shown in FIG. 6D. This step will be easier to be interpreted by using sectional view than top view, so only sectional view is illustrated. Only metal can be used as conductive layer 106, which can be aluminum, chromium, molybdenum, or other conductive metal, or alloy of the above materials. Formation of the conductive layer 106 can be sputtering or vacuum evaporation.

Figure 5C:
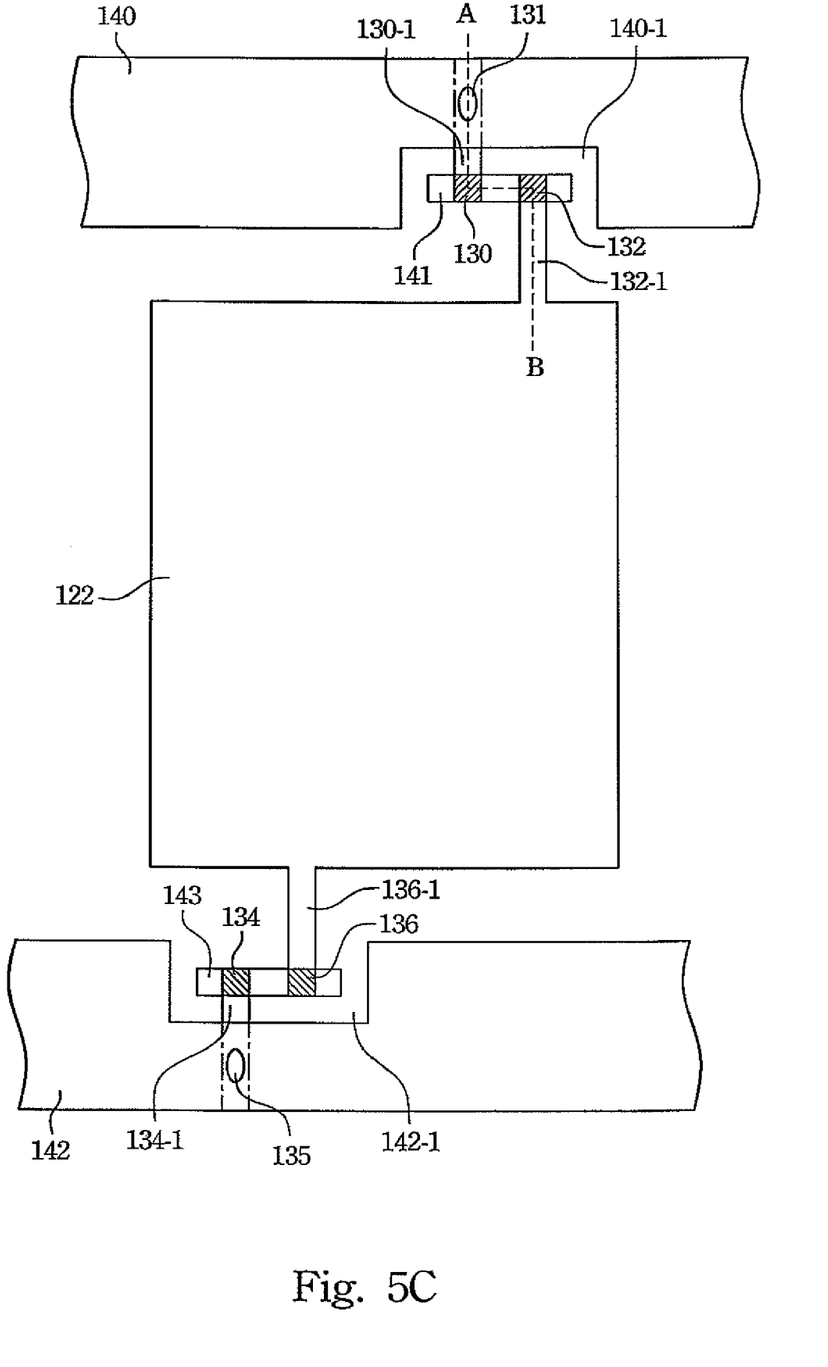
Figure 5D:
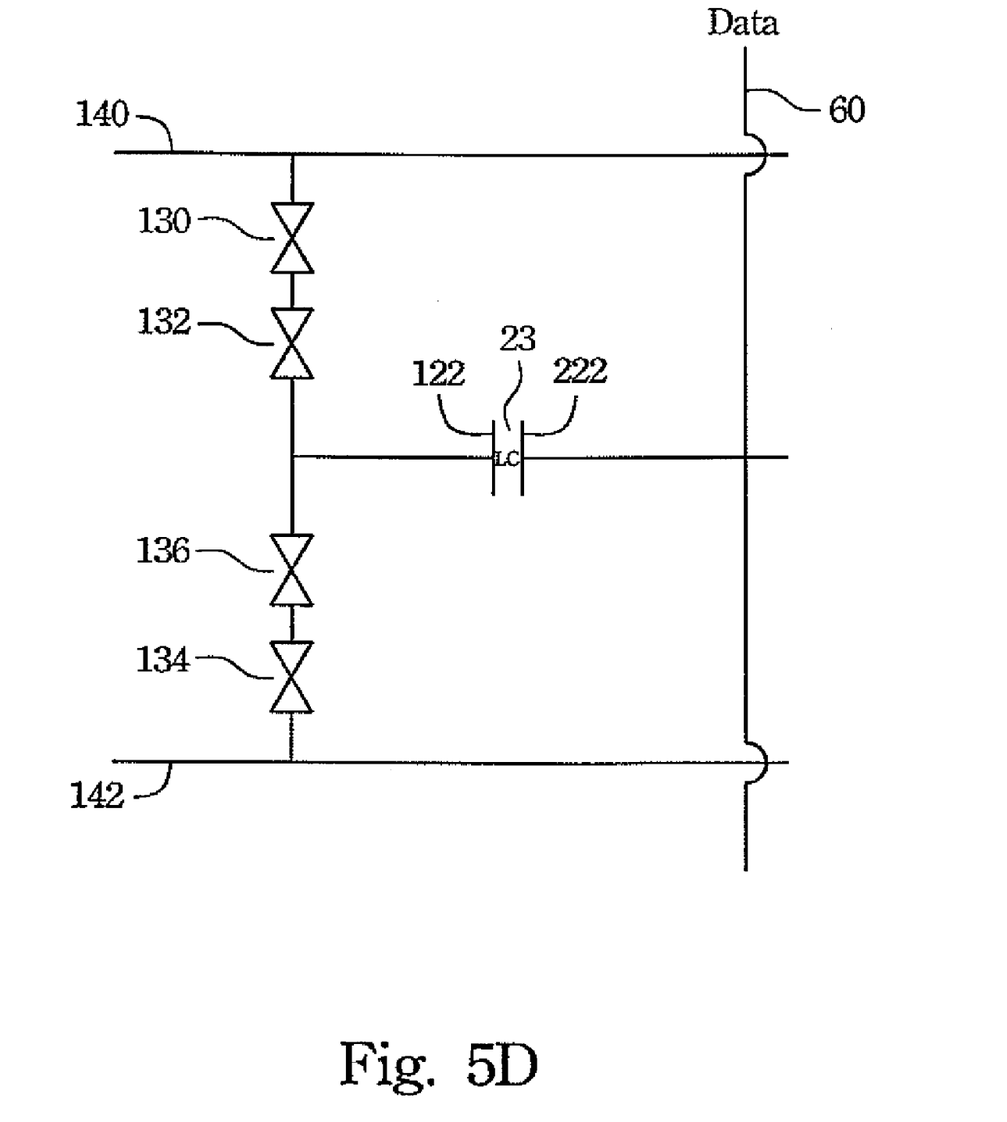
FIG. 5D illustrates a schematic representation of a pixel cell electric circuits of a present back-to-back TFD LCD.
Figure 6E:
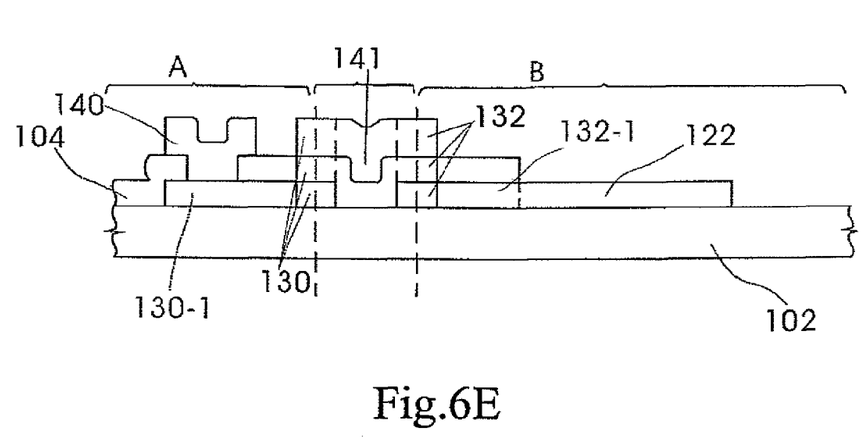

Then, the conductive layer 106 is defined as a first scanning line 140, a second scanning line 142, and a first top layer 141, a second top layer 143 of the four MIM diodes, as shown in FIG. 5C and FIG. 6E. The first scanning line 140 electrically connects to the first bottom layer 130-1 via the first contact opening 131 and has a first indentation 140-1 at an edge of the first scanning line 140, and the first indentation 140-1 faces a side of the first pixel electrode 122 and expands towards an opposite edge of the first scanning line 140. The first bottom layer 130-1 is disposed on the first substrate 102 and electrically connected to the first scanning line 140. The second scanning line 142 electrically connects to the third bottom layer 134-1 via the second contact opening 135 and has a second indentation 142-1 at an edge of the second scanning line 142, and the second indentation 142-1 faces another side of the first pixel electrode 122, and expands towards an opposite edge of the second scanning line 142. The third bottom layer 134-1 is disposed on the first substrate 102 and electrically connected to the second scanning line 142. In this stage, similar photolithographic process and etching step are used, and only mask patterns are changed to scanning line patterns and top layer patterns. Further, appropriate etchant are used to remove a portion of conductive layer 106. The first top layer 141 is physically and electrically isolated to the first scanning line 140 and the second top layer 143 is physically and electrically isolated to the second scanning line 142 in this invention. Moreover, the first top layer 141 and the second top layer 143 are disposed on the first substrate and within the first indentation 140-1 of the first scanning line 140 and the second indentation 142-1 of the second scanning line 142 respectively, such that a first TFD 130, which is sequentially composed of the first bottom layer 130-1, the semiconductor insulation layer 104 and the first top layer 141, and a second TFD 132, which is sequentially composed of the second bottom layer 132-1, the semiconductor insulation layer 104 and the first top layer 141, are disposed on the first substrate and within the first indentation 140-1 of the first scanning line 140, and a third TFD 134, which is sequentially composed of the third bottom layer 134-1, the semiconductor insulation layer 104 and the second top layer 143, and a fourth TFD 136, which is sequentially composed of the fourth bottom layer 136-1, the semiconductor insulation layer 104 and the second top layer 143 are disposed on the first substrate and within the second indentation 142-1 of the second scanning line 142. Equivalent circuits of the TFD structure in this invention will be equivalent to FIG. 1, but pixel electrode 122 will have greater area than prior arts shown in FIG. 3. When the active substrate 102 and the color filter substrate are sealed and has a plurality of liquid crystal molecules between the active substrate 102 and the color filter substrate, the other pixel electrode 222 overlaps to the pixel electrode 122 and the data line 60 electrically connects to the other pixel electrode 222 and about perpendicular to the first and second scanning line 140, 142. Hence, aperture of LCD device is increased. Compared to the prior art, only mask patterns are changed in lithographic process, to make all TFDs in conformation of scanning lines, such that process cost will not be increased.

The main advantage of high aperture can be reached to design the four back-to-back TFDs within the scanning lines. This method includes using transparent conductive layer as pixel electrode and first metal layer of the TFDs, manufacturing a semiconductor insulation layer, and a metal layer deposited thereon as scanning lines and second metal layer of the TFDs, in which the TFDs are designed within conformation of the scanning lines. Hence, simple process and high yield in this invention can be maintained.

Although specific embodiments have been illustrated and described, it will be obvious to those skilled in the art that various modifications may be made without departing from what is intended to be limited solely by the appended claims.

What is claimed is:

1. A method for manufacturing a liquid crystal display, the method comprising:
   depositing a transparent conductive layer on a first substrate;
   defining the transparent conductive layer to form a first pixel electrode, a first bottom layer, a second bottom layer electrically connecting to the first pixel electrode, a third bottom layer, and a fourth bottom layer electrically connecting to the first pixel electrode;
   depositing a semiconductor insulation layer on the first substrate and the first pixel electrode, the first bottom layer, the second bottom layer, the third bottom layer, and the fourth bottom layer;
   defining the semiconductor insulation layer to form a first contact opening on the first bottom layer and a second contact opening on the third bottom layer;
   depositing a metal layer on the semiconductor insulation layer;
   defining the metal layer to form a first scanning line with a first indentation at an edge thereof, a second scanning line with a second indentation at an edge thereof, a first top layer, and a second top layer, wherein the first scanning line electrically connects to the first bottom layer via the first contact opening, the second scanning line electrically connects to the third bottom layer via the second contact opening, and both the first indentation and the second indentation face the first pixel electrode, wherein the first top layer is disposed on the first substrate and within the first indentation and physically isolated from the first scanning line, and the second top layer is disposed on the first substrate and within the second indentation and physically isolated from the second scanning line; and
   forming a first metal-insulation-metal diode at an overlapped region between the first bottom layer and the first top layer, a second metal-insulation-metal diode at an overlapped region between the second bottom layer and the first top layer, a third metal-insulation-metal diode at an overlapped region between the third bottom layer and the second top layer, and a fourth metal-insulation-metal diode at an overlapped region between the fourth bottom layer and the second top layer.

2. The method according to claim 1, wherein a material of the transparent conductive layer is ITO or IZO.

3. The method according to claim 1, wherein a material of the semiconductor insulation layer is silicon oxide, silicon oxynitride, tantalum oxide, or carbon nitride alloy.

4. The method according to claim 1, wherein a material of the metal layer is Al, Cr, or Mo.

5. The method according to claim 1, wherein a material of the semiconductor insulation layer is silicon oxide, silicon oxynitride, tantalum oxide, or carbon nitride alloy.

6. The method according to claim 1, wherein when defining the transparent conductive layer to form the first pixel electrode, the first bottom layer, the second bottom layer, the third bottom layer, and the fourth bottom layer, the first bottom layer is electrically isolated to the second bottom layer, and the third bottom layer is electrically isolated to the fourth bottom layer.

7. The method according to claim 1, wherein when defining the transparent conductive layer to form the first pixel electrode, the first bottom layer, the second bottom layer, the third bottom layer, and the fourth bottom layer, a photolithographic process and an etching step are used to form the first pixel electrode, the first bottom layer, the second bottom layer, the third bottom layer, and the fourth bottom layer.

8. The method according to claim 1, wherein when defining the semiconductor insulation layer to form the first contact opening and the second contact opening, a photolithographic process and an etching step are used to form the first contact opening and the second contact opening.

9. The method according to claim 1, wherein when depositing the metal layer on the semiconductor insulation layer, a sputtering process or a vacuum evaporation is used to form the metal layer.

10. The method according to claim 1, further comprises:
    forming a second pixel electrode and a data lines on a second substrate, and the data lines is electrically connected to the second pixel electrode;
    providing a plurality of liquid crystal molecule between the first substrate and the second substrate; and
    sealing the first substrate and the second substrate, wherein the second pixel electrode is overlapped to the first pixel electrode, and the data line is perpendicular to the first and second scanning line.

11. The method according to claim 1, wherein when defining the metal layer to form the first scanning line with the first indentation, and the second scanning line with the second indentation, the first indentation and the second indentation respectively extend by an opposite way from the first pixel electrode.

12. A method for manufacturing a liquid crystal display, the method comprising:
    depositing a transparent conductive layer on a first substrate;
    defining the transparent conductive layer to form a first pixel electrode, a first bottom layer, a second bottom layer electrically connecting to the first pixel electrode, a third bottom layer, and a fourth bottom layer electrically connecting to the first pixel electrode;
    depositing a semiconductor insulation layer on the first substrate and the first pixel electrode, the first bottom layer, the second bottom layer, the third bottom layer, and the fourth bottom layer;
    defining the semiconductor insulation layer to form a first contact opening on the first bottom layer and a second contact opening on the third bottom layer;
    depositing a metal layer on the semiconductor insulation layer; and
    defining the metal layer to form a first scanning line with a first indentation at an edge thereof, a second scanning line with a second indentation at an edge thereof, a first top layer, and a second top layer,
    wherein both the first indentation and the second indentation face the first pixel electrode.

13. The method according to claim 12, wherein the first scanning line electrically connects to the first bottom layer via the first contact opening, the second scanning line electrically connects to the third bottom layer via the second contact opening.

14. The method according to claim 12, wherein the first top layer is disposed on the first substrate and within the first indentation and physically isolated from the first scanning line, and the second top layer is disposed on the first substrate and within the second indentation and physically isolated from the second scanning line.

15. The method according to claim 12, further comprises a step of forming a first metal-insulation-metal diode at an overlapped region between the first bottom layer and the first top layer, a second metal-insulation-metal diode at an overlapped region between the second bottom layer and the first top layer, a third metal-insulation-metal diode at an overlapped region between the third bottom layer and the second top layer, and a fourth metal-insulation-metal diode at an overlapped region between the fourth bottom layer and the second top layer.

16. The method according to claim 12, wherein the first bottom layer is electrically isolated to the second bottom layer, and the third bottom layer is electrically isolated to the fourth bottom layer.

17. The method according to claim 12, wherein when depositing the metal layer on the semiconductor insulation layer, a sputtering process or a vacuum evaporation is used to form the metal layer.

18. The method according to claim 12, further comprises:

forming a second pixel electrode and a data lines on a second substrate, and the data lines is electrically connected to the second pixel electrode;

providing a plurality of liquid crystal molecule between the first substrate and the second substrate; and sealing the first substrate and the second substrate.

19. The method according to claim 18, wherein the second pixel electrode is overlapped to the first pixel electrode, and the data line is perpendicular to the first and second scanning line.

20. The method according to claim 12, the first indentation and the second indentation respectively extend by an opposite way from the first pixel electrode.

\* \* \* \* \*